US012343228B2

(12) United States Patent
Morris

(10) Patent No.: US 12,343,228 B2
(45) Date of Patent: Jul. 1, 2025

(54) DENTAL BURS FOR ANATOMY AND REDUCING ANESTHETIC USE

(71) Applicant: Christopher Morris, Brampton (CA)

(72) Inventor: Christopher Morris, Brampton (CA)

(*) Notice: Subject to any disclaimer, the term of this patent is extended or adjusted under 35 U.S.C. 154(b) by 45 days.

(21) Appl. No.: 16/981,760

(22) PCT Filed: Mar. 29, 2019

(86) PCT No.: PCT/CA2019/000088
§ 371 (c)(1),
(2) Date: Sep. 17, 2020

(87) PCT Pub. No.: WO2019/183711
PCT Pub. Date: Oct. 3, 2019

(65) Prior Publication Data
US 2021/0030515 A1 Feb. 4, 2021

Related U.S. Application Data

(60) Provisional application No. 62/761,567, filed on Mar. 30, 2018.

(51) Int. Cl.
A61C 3/02 (2006.01)

(52) U.S. Cl.
CPC .................... A61C 3/02 (2013.01)

(58) Field of Classification Search
CPC .... A61C 3/02; A61C 3/03; A61C 3/06; A61C 3/025; A61C 5/40; A61C 5/42; A61C 8/0089; A61C 1/084; A61C 1/07; A61C 1/082; A61C 5/44; A61C 8/0018; A61C 1/12; A61C 3/00; A61C 8/0024; A61C 3/12; A61C 17/00; A61C 17/0202; A61C 8/0037; A61B 17/1615; A61B 17/1617; A61B 17/32002; A61B 2017/1602; A61B 17/1622; Y10T 83/00; Y10T 408/89; Y10T 409/509348; Y10T 137/0469
See application file for complete search history.

(56) References Cited

U.S. PATENT DOCUMENTS

| 749,624 | A | * | 1/1904 | McCullough | A61C 3/02 433/165 |
| 2,328,629 | A | * | 9/1943 | Eich | B27G 15/00 408/230 |
| 2,715,772 | A | * | 8/1955 | Fritz | A61C 3/02 408/229 |

(Continued)

FOREIGN PATENT DOCUMENTS

| RU | 185461 U1 | 12/2018 |
| SU | 1659037 A1 | 6/1991 |

(Continued)

OTHER PUBLICATIONS

Morris, C., European Extended Search Report, EP 19775022.7, Sep. 10, 2021, 10 pages.

Primary Examiner — Heidi M Eide
Assistant Examiner — Lina Faraj
(74) Attorney, Agent, or Firm — Rahman LLC

(57) ABSTRACT

Two new burs to be used in dentistry applications. The two burs are used one after the other to create a natural anatomy in restorations of teeth. One of the burs also reduces the need for anesthetic by providing for minimal contact with the dentin while removing the enamel when cutting into a tooth.

4 Claims, 6 Drawing Sheets

(56) References Cited

U.S. PATENT DOCUMENTS

| | | | | |
|---|---|---|---|---|
| 3,670,416 | A * | 6/1972 | Kroder | A61C 3/02 433/165 |
| 4,611,508 | A * | 9/1986 | Roane | A61C 5/42 76/119 |
| 4,613,307 | A * | 9/1986 | Neumeyer | A61C 3/06 433/166 |
| 4,830,615 | A * | 5/1989 | Goldstein | A61C 3/06 433/229 |
| 4,897,037 | A * | 1/1990 | Appleby | A61C 3/02 40/913 |
| 5,080,588 | A * | 1/1992 | O'Brien | A61C 3/02 433/165 |
| 5,779,476 | A * | 7/1998 | Roetzer | A61C 3/02 433/165 |
| 5,836,765 | A * | 11/1998 | Hickok | A61C 3/166 433/119 |
| 6,186,788 | B1 | 2/2001 | Massad | |
| 6,206,695 | B1 * | 3/2001 | Wong | A61C 5/40 433/102 |
| 6,565,356 | B2 * | 5/2003 | Oyamada | A61C 3/02 433/165 |
| 6,682,349 | B1 * | 1/2004 | Logeart | A61C 3/02 408/226 |
| 10,016,256 | B2 * | 7/2018 | Simmons, Jr. | A61C 8/0089 |
| 10,092,371 | B1 * | 10/2018 | Roetzer | A61C 3/02 |
| 2003/0232307 | A1 * | 12/2003 | Beppu | A61C 3/06 433/165 |
| 2004/0081940 | A1 * | 4/2004 | Roetzer | A61C 3/02 433/165 |
| 2004/0191723 | A1 * | 9/2004 | Shearer | A61C 5/42 433/102 |
| 2004/0191725 | A1 * | 9/2004 | Szymaitis | A61C 3/02 433/165 |
| 2005/0282108 | A1 * | 12/2005 | Goodis | A61C 5/44 433/102 |
| 2006/0115787 | A1 * | 6/2006 | Deutsch | A61C 3/02 433/102 |
| 2006/0228667 | A1 * | 10/2006 | Buchanan | A61C 5/40 433/102 |
| 2007/0101827 | A1 * | 5/2007 | Quan | A61C 5/42 451/48 |
| 2007/0184408 | A1 * | 8/2007 | Volle | A61C 3/02 433/165 |
| 2007/0259314 | A1 * | 11/2007 | Danger | A61C 3/02 433/165 |
| 2009/0162812 | A1 * | 6/2009 | Harouni | A61C 3/06 433/166 |
| 2010/0092919 | A1 * | 4/2010 | Matsutani | B24D 7/18 204/486 |
| 2010/0248182 | A1 * | 9/2010 | Sonoi | A61C 3/02 433/166 |
| 2012/0214125 | A1 | 8/2012 | Clark et al. | |
| 2014/0106297 | A1 * | 4/2014 | Schmidlin | A61C 17/005 433/82 |
| 2020/0022782 | A1 * | 1/2020 | Tajbakhsh | A61C 3/03 |
| 2020/0405443 | A1 * | 12/2020 | Morris | A61C 3/02 |

FOREIGN PATENT DOCUMENTS

| | | |
|---|---|---|
| WO | 2004034920 A2 | 4/2004 |
| WO | 2019183710 A2 | 9/2019 |
| WO | 2019183711 A2 | 9/2019 |

* cited by examiner

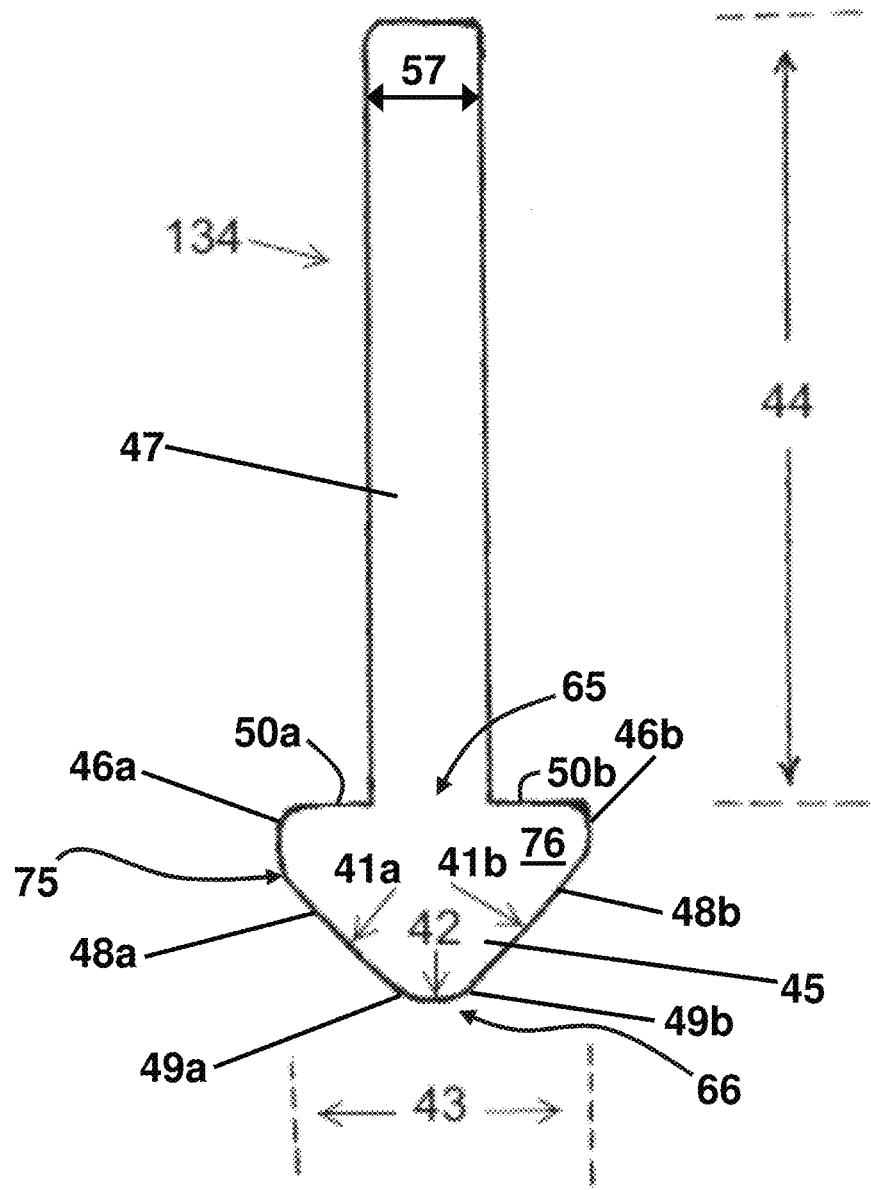

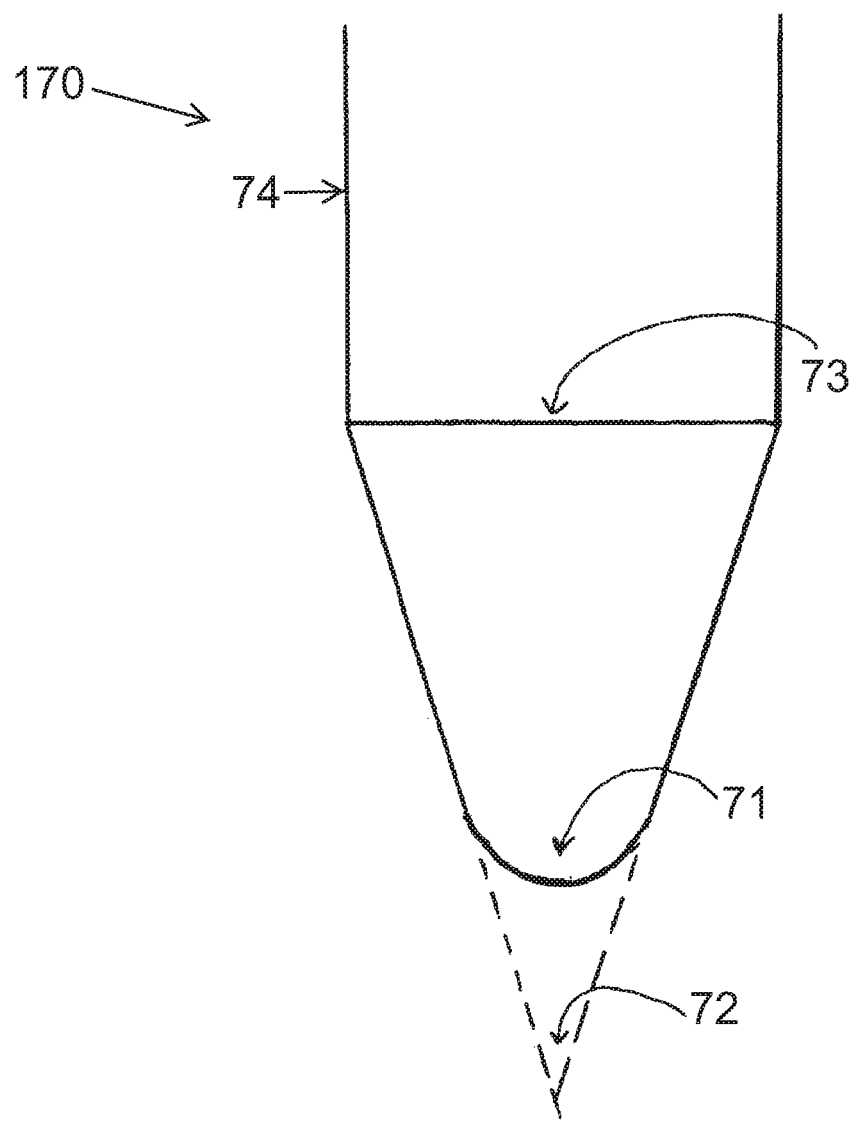

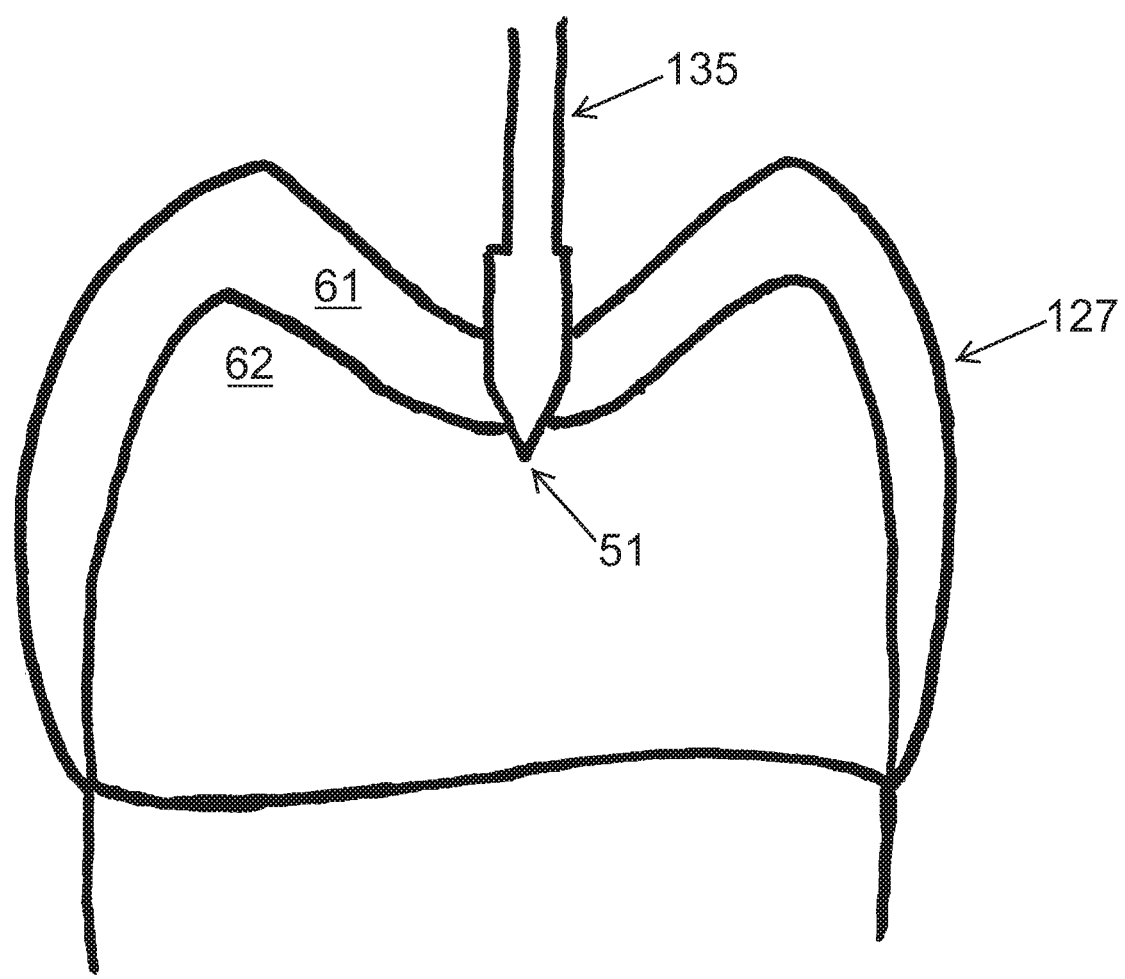

DENTAL BURS FOR ANATOMY AND REDUCING ANESTHETIC USE

FIELD OF THE INVENTION

The field of the invention is burs in dentistry. A dental bur fits into a hand drill to cut the tooth and or restorative material.

BACKGROUND OF THE INVENTION

After a dentist places a resin restoration on a posterior tooth, the resin has to be adjusted to fit the cusps of the opposing tooth. Presently, dentists use round burs and football shaped burs to perform this adjustment. Another bur for adjusting fillings was suggested in U.S. Pat. No. 5,779,476 where a bur in the shape of a cone could be used to create lifelike appearing restorations. The use of all these prior art burs have their problems.

The curved cutting surface of the round burs and football burs cut rounded concave shapes into the filling and the enamel and cannot be relied upon to create a real-life appearance to the tooth. This is because they do not allow the operator to cut the straight flat areas of the cuspal inclines. Straight flat cuspal inclines are what actually occur naturally in teeth.

The Raptor bur from U.S. Pat. No. 5,779,476, has a flat surface that can cut flat cuspal inclines. However, U.S. Pat. No. 5,779,476 says the bur is designed to be held vertically so that it can "make cuts that closely match the naturally occurring topography of human teeth." By holding the Raptor bur vertically, the patent claims it will cut grooves into the occlusal surface of the tooth where these grooves are supposed to match naturally occurring grooves in real teeth.

U.S. Pat. No. 5,779,476 claims it can be used in a vertical manor so that "the shoulder of the bur will actually "bump" into the enamel rim of the surface margin of the tooth. This effect avoids "overcutting" and removing enamel instead of resin. It also limits the amount of final adjustment to be made with carbon papers and the like that the patient bites into for occlusal adjustment."

Some limitations of the Raptor bur are:

(1) The Raptor bur does not produce a natural occurring anatomy. Naturally occurring teeth commonly have flat cuspal inclines and a curved trough area between the cuspal inclines and the Raptor bur eliminates this trough when used as directed.

(2) A lot of dentists bevel the margin of the fillings to enlarge the composite resin seal around the filling. So, when the composite is beveled up on top of the cuspal inclines there is no enamel to bump into to "create a limit stop effect" as stated by U.S. Pat. No. 5,779,476.

(3) Dentists who create bevels in the enamel margin of the occlusal filling and on the cuspal inclines wish to preserve the length of the bevel to create a larger seal around the filling. To do this the dentist will not want to limit the use of the carbon papers as stated in U.S. Pat. No. 5,779,476, but instead they will want to tip the bur on its side and use carbon papers carefully to preserve the beveled seal.

The cone shaped bur in U.S. Pat. No. 5,779,476 was supposed to adjust the occlusion and simultaneously place the occlusal fissures or grooves producing a lifelike appearance while conserving enamel. However, the cone shaped bur in U.S. Pat. No. 5,779,476 actually does not create a lifelike appearance to the tooth.

FIG. 1A shows a tooth 27 comprising natural tooth anatomy with cusps and occlusal trough area and occlusal fissures. FIG. 1B shows a cross section of the tooth 27. FIG. 1B also shows the flat cuspal inclines 29, the rounded or curved occlusal trough area 30, as well as the occlusal fissure 31 in the middle of the trough, which are all found in natural anatomy.

FIG. 2A shows a tooth 32 and the cone shaped bur 33 of U.S. Pat. No. 5,779,476. The bur 33 of U.S. Pat. No. 5,779,476 completely cuts out and eliminates the natural trough area and the natural tiny fissure and leaves a single wide deep groove. Therefore, the bur 33 of U.S. Pat. No. 5,779,476 actually does not create a lifelike appearance.

What is needed is a bur or burs used in combination that allow dentists to adjust the filling to fit the opposing teeth and also maintain the beveled seal that will also simultaneously create naturally occurring anatomy. To create the natural appearance of the tooth 28 of FIG. 1B the dentist could use two separate burs.

In the past it has been difficult to create a reliable bur 35 to cut tiny fissures 31. A reliable bur to cut tiny fissure is also important in dentistry to cut the enamel to expose decay.

Presently, dentists are using a bur similar to bur 35 made with metal flutes called a fissurotomy bur by SS White to cut enamel fissures. However, this bur dulls quickly and has to be discarded after only a few uses or it will heat the tooth when cutting. It would be better if the bur 35 was a diamond grit bur as diamond grit burs can be used repeatedly without dulling.

Diamond grit burs are made using a blank metal shape which is electroplated with a coating of diamond grit of varying sizes of grit. Although diamond grit burs would be preferred, a fissurotomy diamond bur has not been manufactured and sold to dentists because the pressures on a tiny tip during cutting enamel are extreme and the diamond grit layer shears off the metal blank.

BRIEF DESCRIPTION OF THE DRAWINGS

FIG. 3 illustrates another view of the bur of FIG. 2B according to the invention.
FIG. 5 illustrates another metal blank for a bur according to the invention.
FIG. 6 illustrates a bur cutting into the enamel of a tooth according to the invention.

DETAILED DESCRIPTION

Figure 1A:
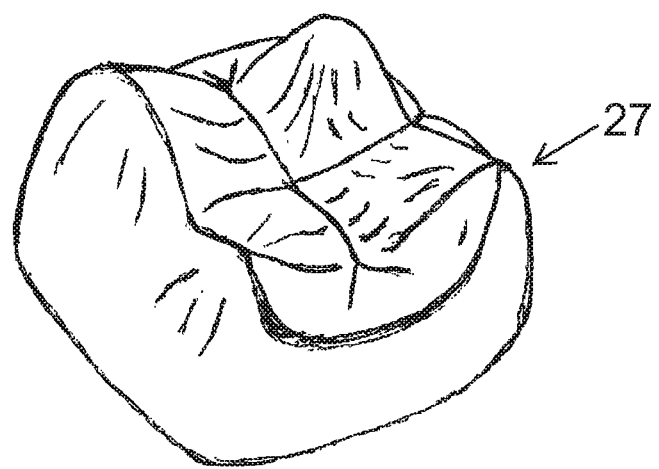
FIG. 1A illustrates an example tooth.
Figure 1B:
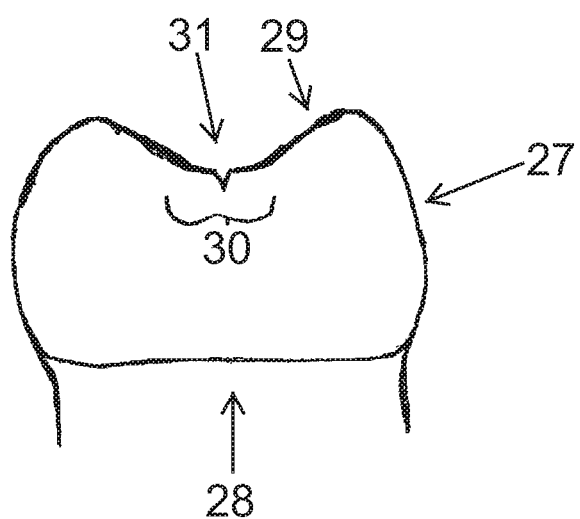
FIG. 1B illustrates a cross-section of the tooth of FIG. 1A.
Figure 2A:
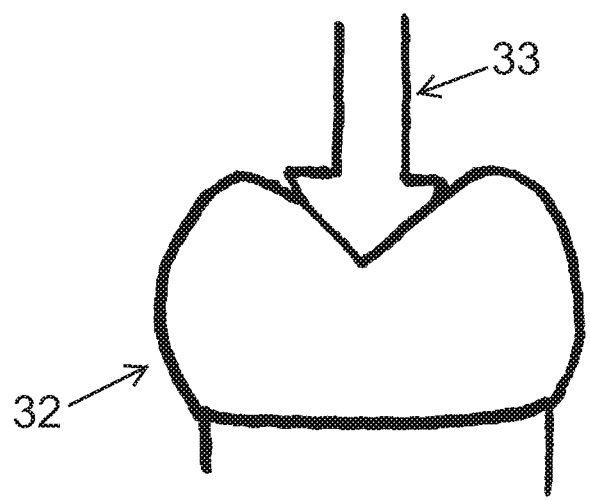
FIG. 2A illustrates a tooth with a cone shaped bur
Figure 2B:
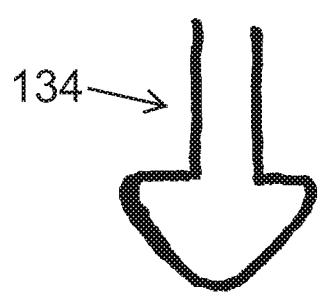
FIG. 2B illustrates a bur according to the invention.
Figure 2C:
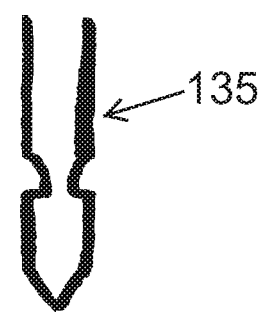
FIG. 2C illustrates another bur according to the invention.

FIG. 2B shows a bur 134 which could be used to adjust the occlusion and leave behind the flat cuspal inclines 29 and the trough area 30 of FIG. 1B. Then, another bur 135 with a small sharp point as shown in FIG. 2C can be used to cut the tiny fissure 31 of FIG. 1B.

FIG. 3 shows a preferred embodiment of the occlusal adjustment bur 134 of FIG. 2B, which can be tipped on its side for use and be used with carbon paper to preserve the composite bevel and simultaneously create the trough area and flat cuspal inclines to create the basis of natural occurring anatomy. All that is needed after the use of bur 134 is another bur 135 of FIG. 2C to cut small natural fissures or grooves.

FIG. 3 shows the new bur 134 where the angle of divergence of the side walls 41a and 41b is preferably 85 degrees but can be from 70 to 95 degrees. The radius of the radial point 42 is preferably 1.0 mm but can be 0.8 mm to 1.2 mm. The bur 134 widens at the angle of divergence to a minimum diameter of 3 mm to a maximum diameter (width) 43 of 4.5 mm. The shank length 44 may be from 10 mm to 14 mm. The cutting surface of the bur 134 can be diamond grit or metal flutes.

FIG. 3 illustrates a dental occlusal adjustment bur 134 comprising a shank 47 comprising a first width 57; and a tooth enamel cutting surface tip 45 extending from the shank 47. The cutting surface tip 45 comprises a first end 65 connected to the shank 47. The first end 65 comprises a second width 43 defining a maximum width of the cutting surface tip 45. The second width 43 is greater than the first width 57. The first end 65 comprises a pair of back walls 50a, 50b directly connected and perpendicular to the shank 47. The tip 45 comprises a second end 66 opposite to the first end 65. The second end 66 comprises a radial point 42. The tip 45 comprises a pair of side walls 41a, 41b connected to the pair of back walls 50a, 50b, the pair of side walls 41a, 41b comprising a first side wall 41a and a second side wall 41b, wherein each side wall 41a, 41b comprises a first portion 46a, 46b comprising a first curved surface, a second portion 48a, 48b extending from the first portion 46a, 46b and comprising a flat surface, and a third portion 49a, 49b extending from the second portion 48a, 48b and comprising a second curved surface. The first portion 46a, 46b defines the side edges of the pair of back walls 50a, 50b. A convergence of the third portion 49a, 49b of the first side wall 41a and the third portion 49a, 49b of the second side wall 41b forms the radial point 42. The second portion 48a, 48b of each side wall 41a, 41b is angled between 70 to 85 degrees with respect to the radial point 42. The tip 45 comprises a substantially conical shape 75 having a gradually tapered width beginning at the first end 65 and ending at the radial point 42 at the second end 66. The tooth enamel cutting surface tip 45 comprises a uniform diamond grit coating 76 extending from the first end 65 to the second end 66. The radial point 42 comprises a radius between 0.8 mm to 1.4 mm. The second width 43 of the cutting surface tip 45 extends from the first portion 46a, 46b of the first side wall 41a to the first portion 46a, 46b of the second side wall 41b. The second width 43 is between 3.5 mm to 4.5 mm. The cutting surface tip 45 adjusts an occlusion of an enamel restoration of a tooth by creating flat cuspal inclines 29 and a trough area 30 (of FIG. 2B) in a central area 30 (of FIG. 2B) of the restoration.

By experimentation with numerous different prototypes, the inventor has discovered a preferred shape of the metal blank with a small point that does enable the bur 134 to retain a diamond grit without shearing off during cutting.

Figure 4:
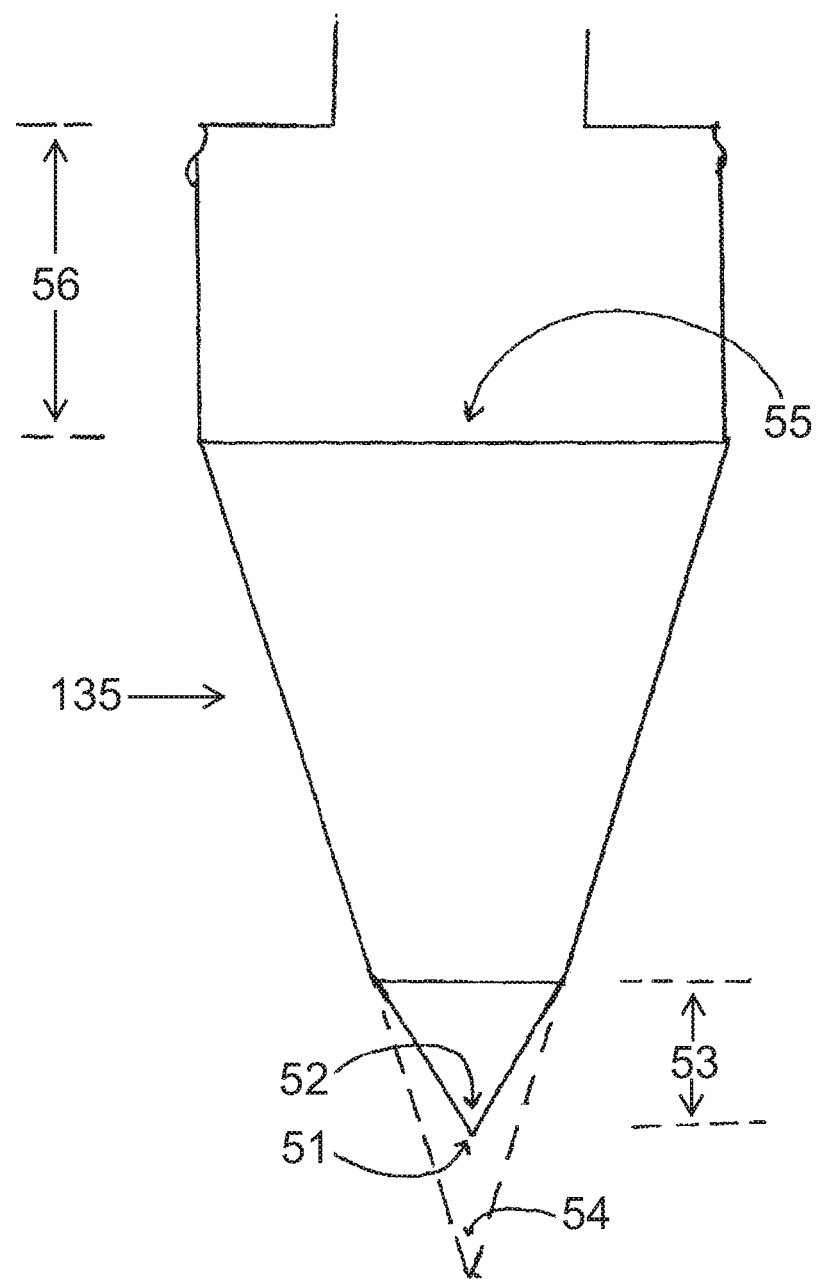
FIG. 4 illustrates a metal blank for a bur according to the invention.

FIG. 4 shows a preferred metal blank dimension for the new diamond grit bur 135 of FIG. 2C, which creates the occlusal fissure in the middle of the trough. Slight variations of the angles on the metal blank will also function to retain a diamond grit under pressure of cutting on the tip of the bur 135. The bur 135 is short shanked and is preferably 14 mm to 16 mm in length so it can be held vertically even in areas of the third molar.

The solid lines in FIG. 4 show the outline of the metal blank. FIG. 4 shows the metal blank configurations for a new diamond grit bur 135 where the metal blank starts at a point 51, where the sides of the metal blank diverge by a first angle 52 of preferably 60 degrees but could be from 45 to 75 degrees, for preferably a distance 53 of 0.35 mm but could be from 0.25 mm to 0.6 mm and then the sides of the metal blank change to a second angle 54 of preferably 34 degrees but can be from 25 to 40 degrees and where the blank widens at the second preferred angle to a diameter 55 of 0.8 mm to 1.4 mm. Once the desired diameter of the blank is reached the sides 56 of the blank and the bur 135 become parallel.

The key to the ability of this new bur 135 to retain a diamond grit under the pressure of cutting is found to be that the very tip of the blank has a first angle preferably close to 60 degrees. It is also important to make the bur 135 as narrow as possible for conservative cutting. To make the bur 135 narrow and conservative the first angle extends along the length of the bur 135 for as short a distance as possible, just enough so that the first angle will retain the grit under pressure and then the bur 135 changes to a second, lesser angulation. A preferred length of implementation of the first angle for grit retention is 0.35 mm but can be from 0.25 mm to 0.6 mm. The first angle is needed to retain the diamond grit but the second, smaller angle is needed to commence near the tip to make the bur 135 as narrow as possible while still retaining the grit at the tip. So, the first and second angles and how where they are placed on the blank is a balance that had to be worked out by experimentation by making burs of differing designs and angles.

FIG. 5 illustrates another bur 170, which is a variation of bur 135 with a rounded tip having a radius 71. The rounded tip with radius 71 is not for cutting the fissures for creating a natural occurring anatomical appearance but can be used when using the bur 170 simply for cutting open the fissures of a tooth and reducing the need for anesthetic. FIG. 5 shows a variation of the metal blank for the new diamond grit bur 135 where the first angle is replaced with the tip of radius 71 where the radius 71 is from 0.15 mm to 0.30 mm and the angle 72 extending from the radius 71 is preferably 34 degrees but can be from 25 to 40 degrees and the blank widens at the second preferred angle to a diameter 73 of 0.8 mm to 1.4 mm. Once the desired diameter of the blank is reached the sides 74 of the blank and the bur 170 become parallel.

Another objective of the new burs 135, 170 is to make a bur that can be used to cut into the tooth without anesthetic. Today dentists use flat end cylinder and round burs to cut the enamel into dentin. However, with these current burs the width of the tip or leading edge portion of the bur that starts to cut the enamel is too large and as the tip cuts through the enamel into the dentin below it causes the patient pain. FIG. 6 shows how the tip 51 of the new bur 135 barely cuts into the dentin 62 of a tooth 127 while removing the enamel 61 above causing less pain to the patient. More particularly, FIG. 6 shows how the small tip 51 of the new bur 135 cuts only slightly into the dentin 62 while the wider part of the bur 135 cuts the enamel 61 thus causing less pain to the patient when cutting open the layer of the enamel 61.

What is claimed is:

1. A dental occlusal adjustment bur comprising:
a shank comprising a first width; and
a tooth enamel cutting surface tip extending from the shank,
wherein the cutting surface tip comprises:
a first end connected to the shank, wherein the first end comprises a second width defining a maximum width of the cutting surface tip, wherein the second width is greater than the first width, and wherein the first end comprises a pair of back walls directly connected and perpendicular to the shank;
a second end opposite to the first end, wherein the second end comprises a radial point;

a pair of side walls connected to the pair of back walls, the pair of side walls comprising a first side wall and a second side wall, wherein each side wall comprises a first portion comprising a first curved surface, a second portion extending from the first portion and comprising a flat surface, and a third portion extending from the second portion and comprising a second curved surface, wherein the first portion defines side edges of the pair of back walls, wherein a convergence of the third portion of the first side wall and the third portion of the second side wall forms the radial point, wherein the second portion of each side wall is angled between 70 to 85 degrees with respect to the radial point, and a conical shape having a gradually tapered width beginning at the first end and ending at the radial point at the second end, wherein the tooth enamel cutting surface tip comprises a uniform diamond grit coating extending from the first end to the second end, wherein the radial point comprises a radius between 0.8 mm to 1.4 mm, wherein the second width of the cutting surface tip extends from the first portion of the first side wall to the first portion of the second side wall, and wherein the second width is between 3.5 mm to 4.5 mm, and wherein the cutting surface tip adjusts an occlusion of an enamel restoration of a tooth by creating flat cuspal inclines and a trough area in a central area of the restoration.

2. The bur of claim 1, wherein the shank comprises a length of 14 mm to 16 mm.

3. The bur of claim 1, wherein the shank comprises a length of 10 mm to 13 mm.

4. A method comprising:

using a first dental occlusal adjustment bur to adjust an occlusion of a restoration and creating flat cuspal inclines and a trough area in a central area of the restoration, wherein the bur comprises a shank comprising a first width; and a tooth enamel cutting surface tip extending from the shank, wherein the cutting surface tip comprises: a first end connected to the shank, wherein the first end comprises a second width defining a maximum width of the cutting surface tip, wherein the second width is greater than the first width, and wherein the first end comprises a pair of back walls directly connected and perpendicular to the shank; a second end opposite to the first end, wherein the second end comprises a radial point; a pair of side walls connected to the pair of back walls, the pair of side walls comprising a first side wall and a second side wall, wherein each side wall comprises a first portion comprising a first curved surface, a second portion extending from the first portion and comprising a flat surface, and a third portion extending from the second portion and comprising a second curved surface, wherein the first portion defines side edges of the pair of back walls, wherein a convergence of the third portion of the first side wall and the third portion of the second side wall forms the radial point, wherein the second portion of each side wall is angled between 70 to 85 degrees with respect to the radial point, and a conical shape having a gradually narrowing width beginning at the first end and ending at the radial point at the second end, wherein the tooth enamel cutting surface tip comprises a uniform diamond grit coating extending from the first end to the second end, wherein the radial point comprises a radius between 0.8 mm to 1.4 mm, wherein the second width of the cutting surface tip extends from the first portion of the first side wall to the first portion of the second side wall, and wherein the second width is between 3.5 mm to 4.5 mm; and using a second diamond grit bur to cut small fissures in a center of the trough area to create a natural looking occlusal anatomy in a tooth, wherein the diamond grit second bur for cutting enamel is fabricated using a metal blank, wherein a tip of the metal blank starts from a point and widens with a first angle from 40 to 80 degrees, wherein the first angle extends for a length of 0.25 mm to 0.6 mm, wherein the first angle changes to a second angle, wherein the second angle is from 25 degrees to 40 degrees, wherein the second angle extends until the metal blank has a diameter of 0.8 mm to 1.22 mm, wherein sides of the metal blank become parallel, and wherein the metal blank is coated with a diamond grit.

\* \* \* \* \*